United States Patent [19]
Ezaki

[11] Patent Number: 5,617,147
[45] Date of Patent: Apr. 1, 1997

[54] TRANSMISSION SYSTEM FOR AN ASPECT-AREA-RATIO POSITION ID SIGNAL

[75] Inventor: Tadashi Ezaki, Kanagawa, Japan

[73] Assignee: Sony Corporation, Tokyo, Japan

[21] Appl. No.: 512,372

[22] Filed: Aug. 8, 1995

Related U.S. Application Data

[63] Continuation of Ser. No. 230,424, Apr. 19, 1994, abandoned, which is a continuation of Ser. No. 904,584, Jun. 26, 1992, abandoned.

[30] Foreign Application Priority Data

Jun. 28, 1991 [JP] Japan ................... 3-159092

[51] Int. Cl.⁶ ............... H04N 7/00; H04N 7/01; H04N 7/087
[52] U.S. Cl. ............ 348/461; 348/445; 348/474; 348/478
[58] Field of Search ............... 348/36, 37, 39, 348/426, 432, 435, 441, 445, 460, 461, 465, 467, 473, 474, 476, 478, 487, 553, 555, 556, 558, 578, 594, 596, 913; 358/335; H04N 5/46, 7/00, 7/01, 11/00, 7/087

[56] References Cited

U.S. PATENT DOCUMENTS

| | | | |
|---|---|---|---|
| 4,513,324 | 4/1985 | Poetsch et al. | 358/214 |
| 4,581,640 | 4/1986 | Cole | 358/141 |
| 4,654,696 | 3/1987 | Dayton et al. | 358/11 |
| 4,924,315 | 5/1990 | Yamashita | 358/160 |
| 4,943,856 | 7/1990 | Bakhmutsky et al. | 358/141 |
| 5,032,907 | 7/1991 | Isnardi | 358/141 |
| 5,045,939 | 9/1991 | Okayama et al. | 358/140 |
| 5,099,327 | 3/1992 | Murakoshi | 358/140 |
| 5,159,438 | 10/1992 | Rabii | 358/12 |
| 5,177,609 | 1/1993 | Kawakami et al. | 358/140 |
| 5,179,480 | 1/1993 | Takahashi | 358/909.1 |
| 5,218,436 | 6/1993 | Sugiyama et al. | 358/141 |
| 5,298,994 | 3/1994 | Watanabe et al. | 348/445 |
| 5,307,171 | 4/1994 | Azuma et al. | 358/335 |

FOREIGN PATENT DOCUMENTS

| | | | |
|---|---|---|---|
| 0113934 | 7/1984 | European Pat. Off. | H04N 7/06 |
| 0276985 | 8/1988 | European Pat. Off. | H04N 5/44 |
| 60-165883 | 8/1985 | Japan | H04N 7/01 |
| 2252000 | 7/1992 | United Kingdom | H04N 7/00 |
| 8605644 | 9/1986 | WIPO | H04N 5/232 |

*Primary Examiner*—John K. Peng
*Assistant Examiner*—John W. Miller
*Attorney, Agent, or Firm*—Jay H. Maioli

[57] ABSTRACT

When a picture having a different aspect ratio is displayed, a portion to be cut on the picture can be set properly. In a video signal transmission system in which a pulse signal is superimposed upon a video signal in a predetermined horizontal line within a vertical blanking period thereof and then transmitted, when an aspect ratio of a picture displayed on the basis of a video signal is different from an aspect ratio of a picture screen of a monitor receiver, an information instructing a portion, which is not displayed on the picture screen due to a difference between the two aspect ratios, is superimposed upon a predetermined horizontal line within the vertical blanking period as a pulse signal.

7 Claims, 11 Drawing Sheets

TRANSMISSION SYSTEM FOR AN ASPECT-AREA-RATIO POSITION ID SIGNAL

This is a continuation of application Ser. No. 08/230,424, filed Apr. 19, 1994 now abandoned, which was a continuation of application Ser. No. 07/904,584, filed on Jun. 26, 1992, now abandoned.

BACKGROUND OF THE INVENTION

1. Field of the Invention

The present invention relates to apparatus for recording and/or reproducing a video signal and, more particularly, to a transmission system for an aspect-area ratio ID (identifying) signal.

2. Description of the Prior Art

Figure 1A:
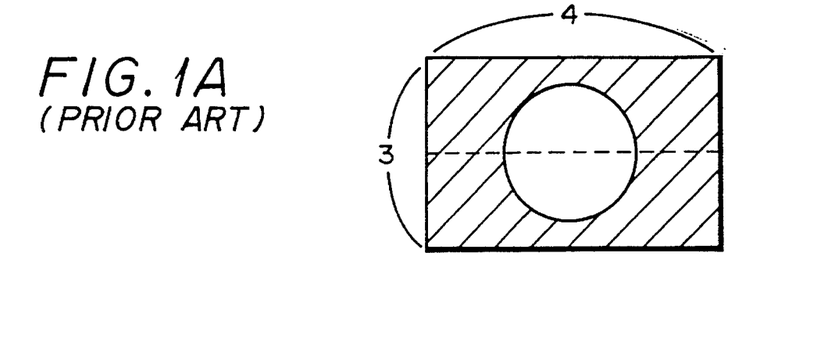
FIGS. 1A and 1B are diagrams used to explain displayed pictures having different aspect ratios according to the prior art, respectively.
Figure 1B:
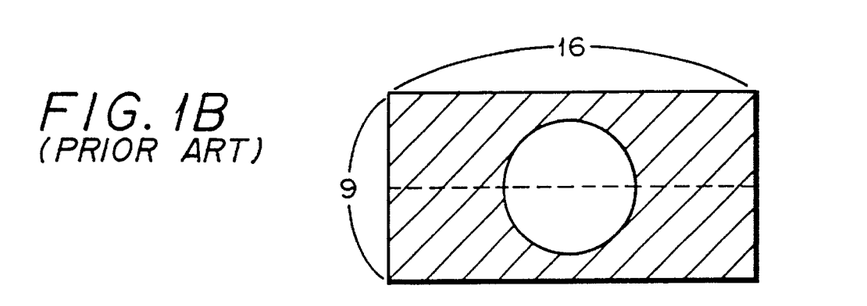

A picture displayed on the basis of standard video signals such as the NTSC video signal or the like has an aspect ratio (width-to-height) ratio of 4:3 as shown in FIG. 1A according to the prior art. Recently, a video tape recorder (VTR) has been proposed to record a picture having an aspect ratio of 16:9 as shown in FIG. 1B, for example. In this case, if the number of horizontal lines per field is the same as that of the prior art and the signal format of a synchronizing (sync.) signal or the like is also the same as that of the prior art, then a video signal having an aspect ratio of 16:9 can be recorded with ease by a video tape recorder which can record a video signal having an aspect ratio of 4:3.

Figure 2A:
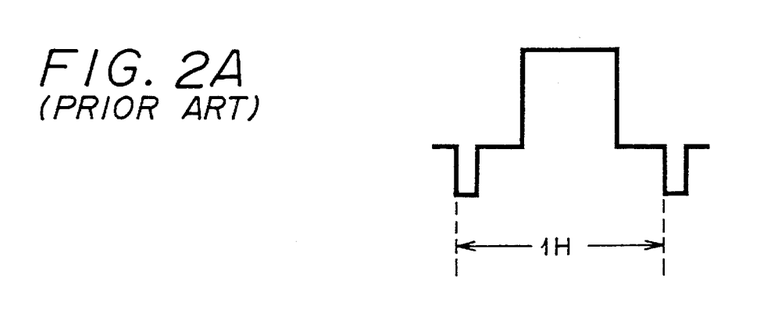
FIGS. 2A and 2B are diagrams used to explain a difference between video signals having different aspect ratios to be displayed according to the prior art, respectively.
Figure 2B:
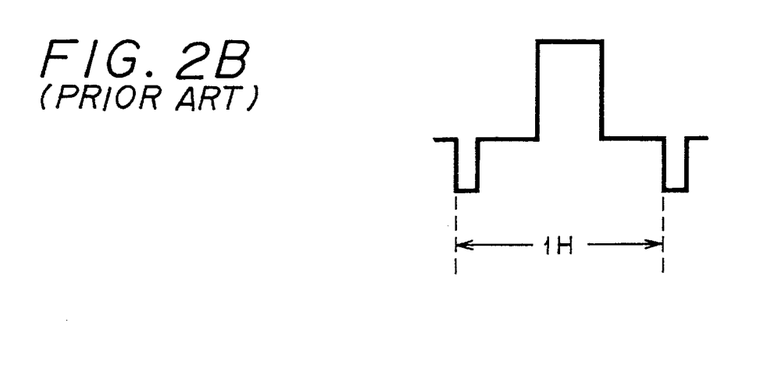

That is, while a video signal of one horizontal line at substantially the center (the scanning position shown by a broken line) of the picture having an aspect ratio of 4:3 as shown in FIG. 1A is represented as shown in FIG. 2A, for example, a video signal of one horizontal line at substantially the center (the scanning position shown by a broken line) of the picture having an aspect ratio of 16:9 as shown in FIG. 1B is represented as shown in FIG. 2B, for example. Accordingly, if the aspect ratio is large, then image information of each horizontal line is compressed and then recorded, which is presented as only the change.

Figure 3:
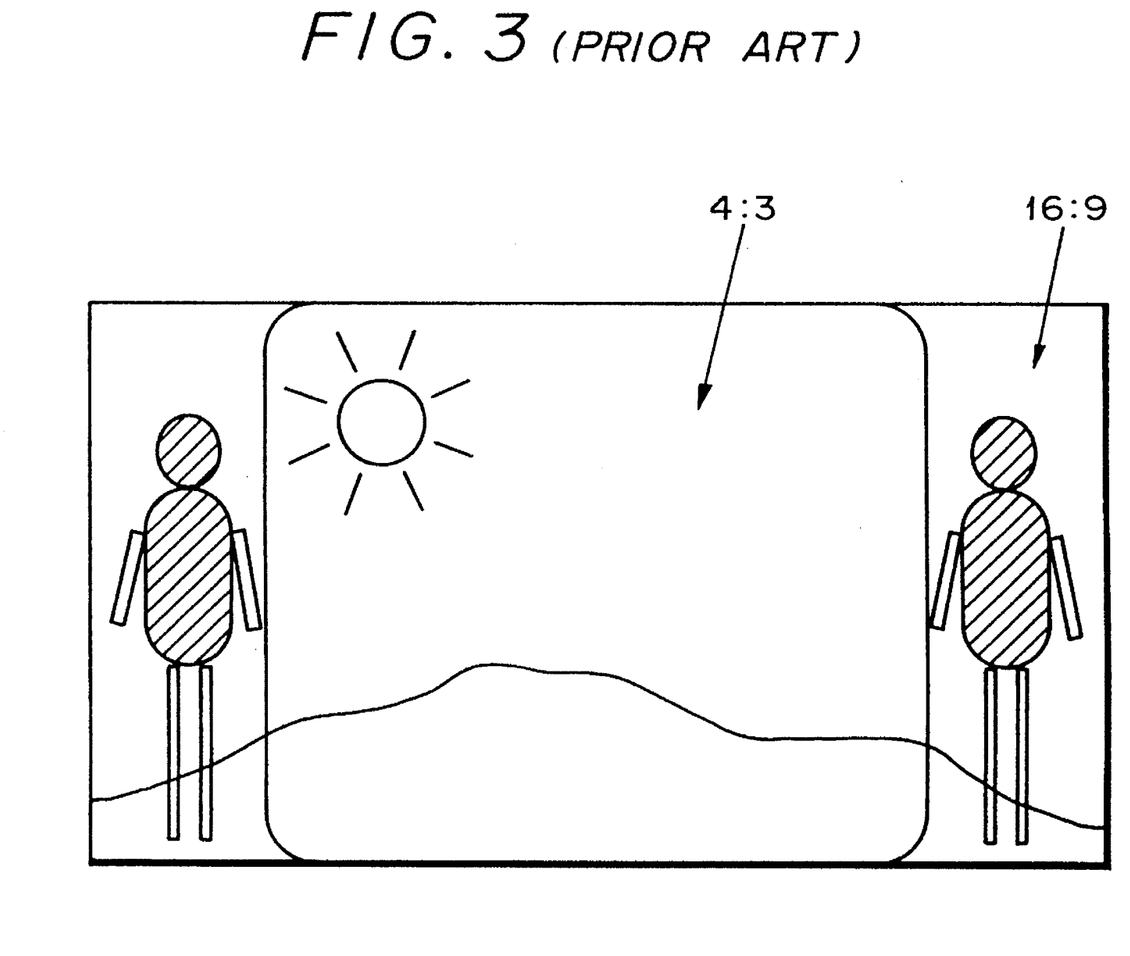
FIG. 3 is a diagram used to explain an example of a displayed picture which is not displayed fully due to a difference between aspect ratios of displayed pictures.

If upon playback the video signal having the aspect ratio of 16:9 is displayed on a standard monitor receiver which receives and reproduces a video signal having an aspect ratio of 4:3, when a portion of the picture in the longitudinal direction is displayed fully, then the left and right end portions of the picture having an aspect ratio of 16:9 are laid out of the picture screen of the monitor receiver (when the left and right ends are cut equally) and thus are omitted from the display, as FIG. 3 illustrates. In this case, if there is some important image information such as when persons are standing at left and right end portions of the picture as shown in FIG. 3, for example, such important image is not displayed. There is then the risk that the viewer cannot correctly understand the contents of this video program.

OBJECTS AND SUMMARY OF THE INVENTION

Therefore, it is an object of the present invention to provide an improved transmission system for an aspect-area ratio ID signal in which the aforesaid shortcomings and disadvantages encountered with the prior art can be eliminated.

More specifically, it is an object of the present invention to provide a transmission system for an aspect-area ratio ID signal in which a portion to be cut on a picture is properly set when a picture having a different aspect ratio is displayed.

It is another object of the present invention to provide a transmission system for an aspect-area ratio ID signal in which a proper display state can be automatically set when a video program is played back.

As a first aspect of the present invention, an apparatus for recording a video signal comprises a detecting circuit for detecting a predetermined horizontal scanning line in the vertical blanking period of the video signal having a first aspect ratio, a positioning circuit for positioning a portion on the monitor to display a video signal having a second aspect ratio to which the video signal having the first aspect ratio is converted, a generating circuit for generating a position code signal corresponding to the position of the portion, and an adder circuit for adding the position code signal on the predetermined horizontal scanning line.

As a second aspect of the present invention, an apparatus for playing back a video signal comprises a converter circuit for converting a video signal having a first aspect ratio to a video signal having a second aspect ratio, a detector circuit for detecting a predetermined horizontal scanning line in which a position code signal of a portion to be displayed on a monitor is added, a generator circuit for generating a timing clock signal in accordance with the detected predetermined horizontal scanning line, and a decoder circuit for decoding the position code signal and providing the decoded signal to the aspect ratio converter.

In accordance with a third aspect of the present invention, an apparatus for converting a first video signal having a first aspect ratio to a second video signal having a second aspect ratio comprises a memory for memorizing the first video signal, and a control circuit for controlling the address of the memory and the clock rate of reading the memory to obtain the second video signal.

The above and other objects, features, and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to the drawings.

Figure 4A:
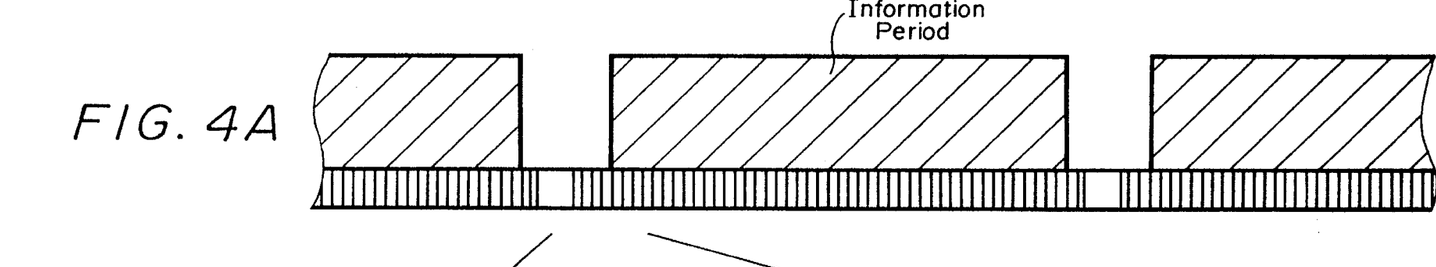
FIGS. 4A through 4C are respectively diagrams used to explain the condition such that data is superimposed upon the vertical blanking period of a video signal according to a first embodiment of the present invention.
Figure 4B:
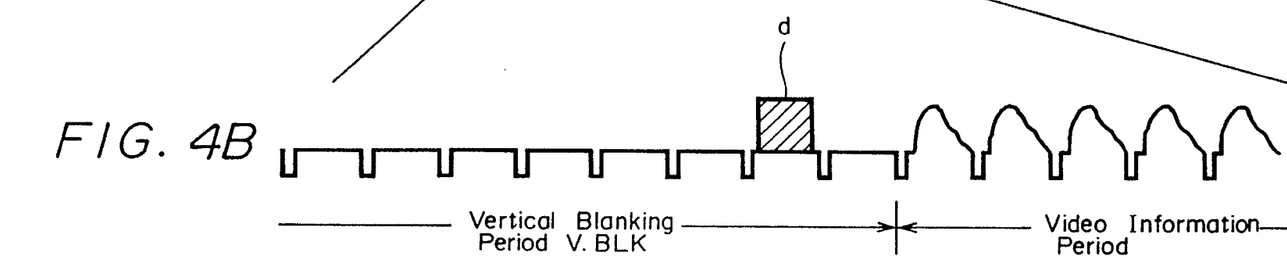
Figure 4C:
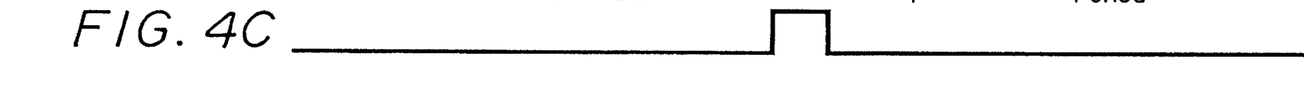

According to a first embodiment of the present invention, an information representative of a display mode is superimposed upon a predetermined horizontal line, e.g., the 20th horizontal line of the vertical blanking period of a video signal and then the video signal is transmitted. More specifically, as shown in FIG, 4A, a video information interval of the video signal is interrupted by a predetermined number of horizontal lines within a vertical blanking period V.BLK of one field cycle. Then, as shown in FIG. 4B, digital data d in the form of a pulse signal is superimposed upon a predetermined one horizontal line (or a plurality of horizontal lines) within this vertical blanking period V,BLK and then the video signal is transmitted. In this case, an information representative of a display mode is encoded and then transmitted as the digital data d. FIG. 4C shows a gating signal that is output from a counter 11 which will be described later.

Figure 5:
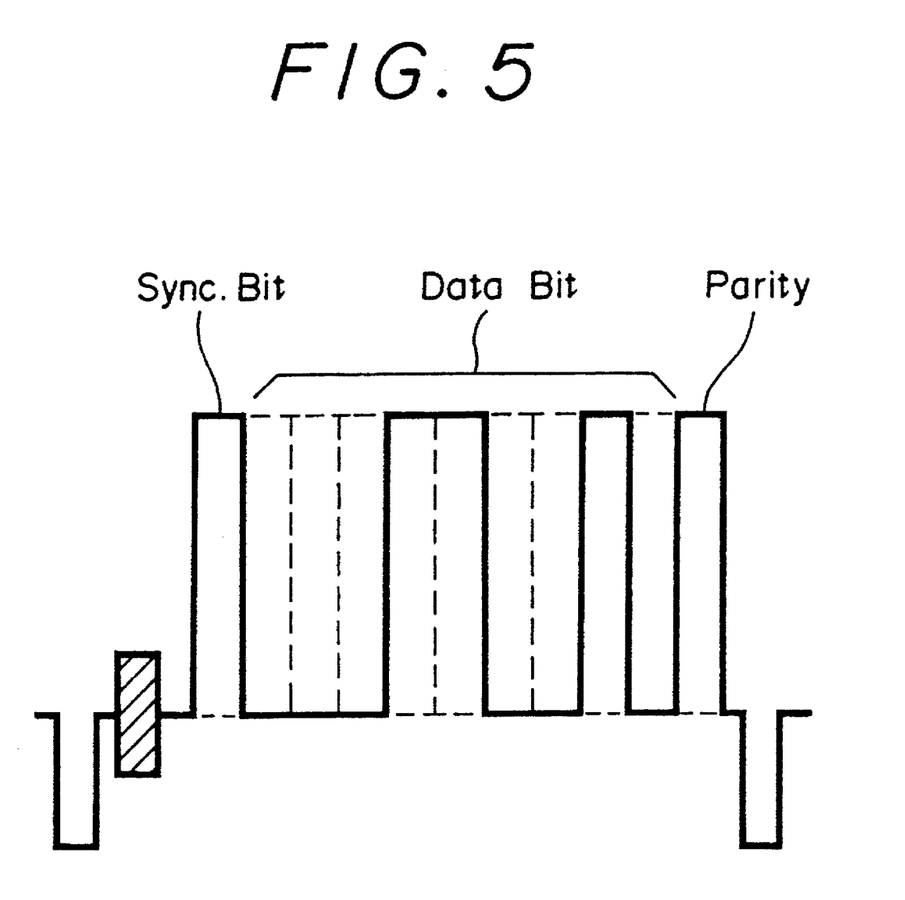
FIG. 5 is a diagram used to explain an example of a transmission code according to the first embodiment of the present invention.

In accordance with this embodiment, digital data superimposed upon a predetermined one horizontal line of the video signal within the vertical blanking period is arranged as shown in FIG. 5.

As shown in FIG. 5, a sync. bit of one bit is provided after a color burst signal of this horizontal line and this sync. bit of one bit is followed by data byte of 9 bits. Finally, a parity bit of one bit is added to the data byte of 9 bits as a data correction code of the data byte. Information representative of the aspect ratio of video signal is encoded and transmitted by the first one bit of the data byte of 9 bits, and information, which is used to set the display mode when the aspect ratio is different, is encoded and transmitted by the remaining 8 bits of the data byte.

An arrangement in which the information representative of the display mode or the like is encoded and then transmitted will be described with reference to FIG. 6.

Figure 6:
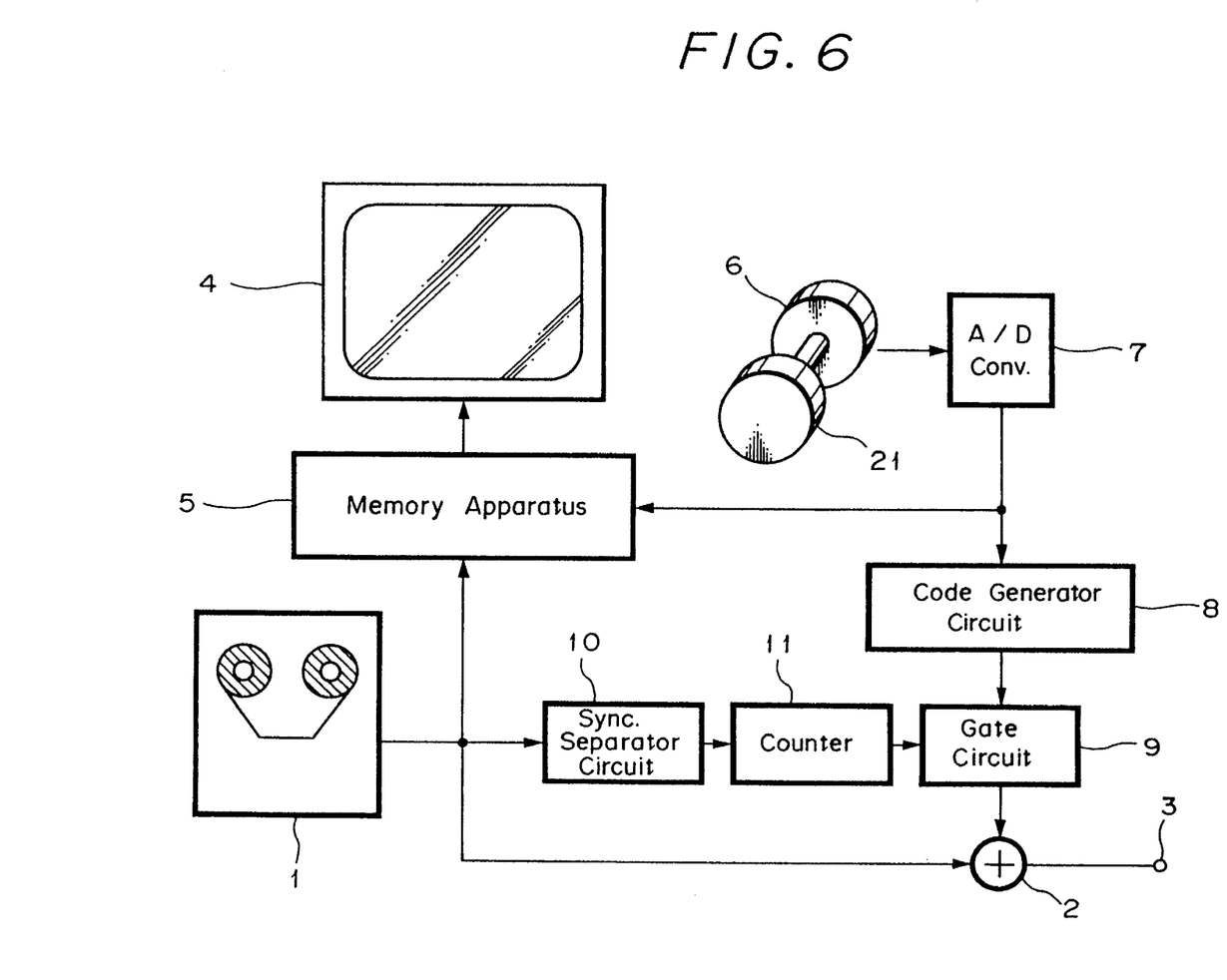
FIG. 6 is a block diagram showing the recording system according to the first embodiment of the present invention.

FIG. 6 of the accompanying drawings shows in block form the recording system according to the first embodiment of the present invention.

Referring to FIG. 6, there is shown a video tape recorder apparatus 1 which loads thereonto a video tape in which a video signal having no information representative of the display mode added thereto is recorded. In this case, the video signal recorded on the video tape is a video signal by which a picture of an aspect ratio of 16:9 is displayed. A video signal reproduced from the video tape recorder apparatus 1 is supplied to a mixer circuit 2, in which a code signal supplied from a gate circuit, which will be described later, is superimposed upon the video signal. The resultant video signal having the code signal superimposed thereon is fed to an output terminal 3. The video signal developed at the output terminal 3 is transmitted via various kinds of transmission lines or recorded by other video tape recorder apparatus, thereby editing or dubbing being carried out.

As shown in FIG. 6, there is provided a monitor receiver 4 whose picture screen has an aspect ratio of 4:3. The video signal reproduced from the video tape recorder apparatus 1 is supplied through a memory apparatus 5 to the monitor receiver 4. The memory apparatus 5 operates to cut off the left and right end portions of the video signal having an aspect ratio of 16:9 to thereby provide a video signal having an aspect ratio of 4:3. That is, the memory apparatus 5 operates to convert the aspect ratio by controlling the write timing and the read-out timing thereof. A display positioner 6 is provided in order to control the write timing and the read-out timing. An output signal from the display positioner 6 is supplied to an analog-to-digital (A/D) converter 7, in which it is converted into digital data and this digital data is supplied to the memory apparatus 5.

The aspect ratio converting processing utilizing the memory apparatus 5 will be described with reference to FIG. 7.

According to this embodiment, as shown in FIG. 3, the left and right end portions of the video signal having the aspect ratio of 16:9 are cut so that the video signal having the aspect ratio of 16:9 is converted into a video signal having the aspect ratio of 4:3. The memory apparatus 5 is adapted to cut off the left end portion or right end portion of each horizontal line.

Figure 7:
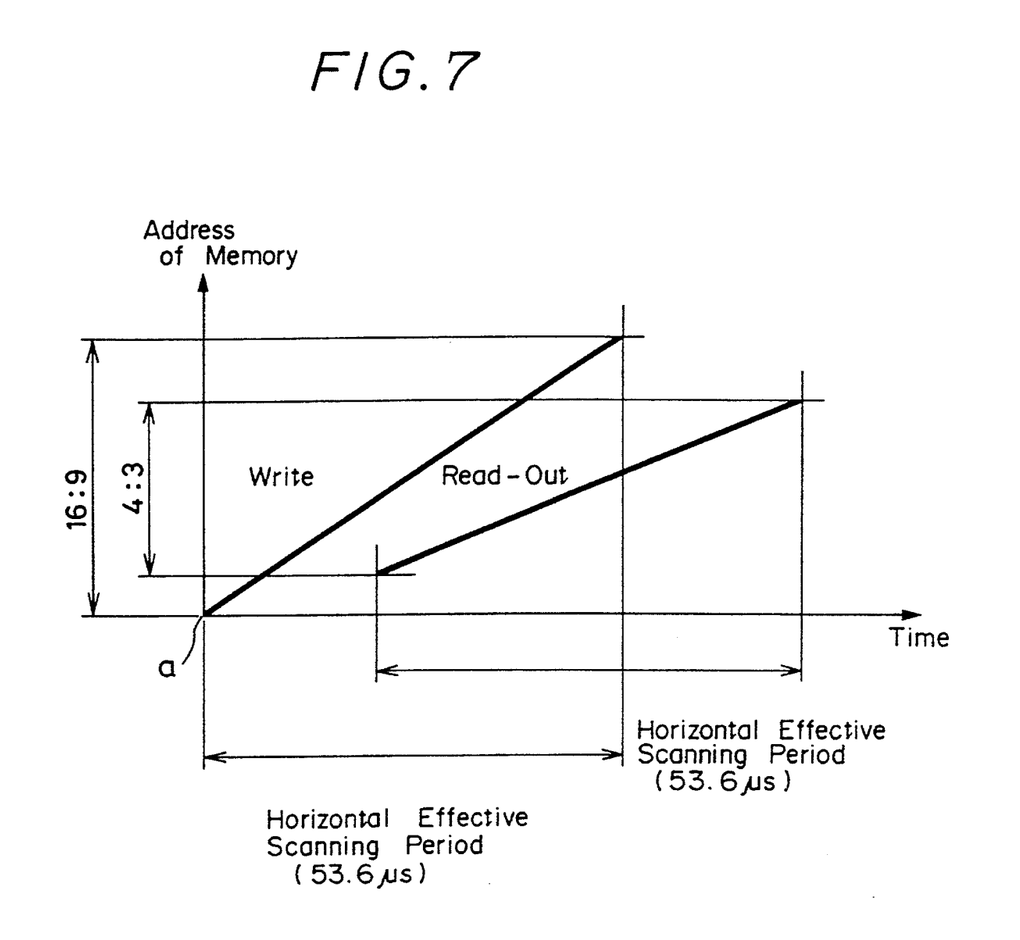
FIG. 7 is a diagram showing a playback processing timing of a memory, to which references will be made in explaining operation of the first embodiment of the present invention.

More specifically, as shown in FIG. 7, horizontal lines of the video signal output from the video tape recorder apparatus 1 are directly written in the memory apparatus 5, whereafter only the portions excluding the portions to be cut off of the horizontal lines thus written are read out from the memory apparatus 5. A read-out position, depicted by reference letter a in FIG. 7, can be changed by the adjustment of the display positioner 6. If the read-out position a is advanced as much as possible, then only the right-hand side end portion of each horizontal line is cut off, and if the read-out start position a is delayed as much as possible, then only the left-hand side end portion of each horizontal line is cut off.

Then, the video signal whose aspect ratio is converted by the memory apparatus 5 as described above is supplied to the monitor receiver 4, whereby a picture based on the video signal having the converted aspect ratio is displayed on the picture screen of the monitor receiver 4. Thus, it is possible to determine the display state (setting state of the cut-off portion).

According to this embodiment, the information representative of the display mode set by the adjustment of the display positioner 6 is coded and superimposed upon the video signal, which is transmitted from the output terminal 3. That is, as shown in FIG. 6, digital data output from the counter or A/D converter 7 on the basis of the adjusting value of the display positioner 6 is supplied to a code generator circuit 8, in which it is converted into a code signal corresponding to the adjusting value of the display positioner 6. Then, the converted code signal is supplied to the gate circuit 9.

The video signal from the video tape recorder apparatus 1 is supplied to a sync. separator circuit 10, in which it is separated to provide sync. signals (horizontal and vertical sync. signals), which are then fed to the counter 11. The sync. signals are counted by the counter 11, thereby detecting a horizontal line on which the code signal shown in FIG. 5 is superimposed. Then, at the timing whereat the video signal of this horizontal line is output from the video tape recorder apparatus 1, a gate control signal is supplied to the gate circuit 9 from the counter 11.

Further, the code signal whose output timing is controlled by the gate circuit 9 is supplied to the mixer circuit 2, in which it is superimposed upon the video signal, and the video signal having the code signal thus superimposed thereon is fed to the output terminal 3.

A code converted by the code generator circuit 8 will be described below.

Figure 8:
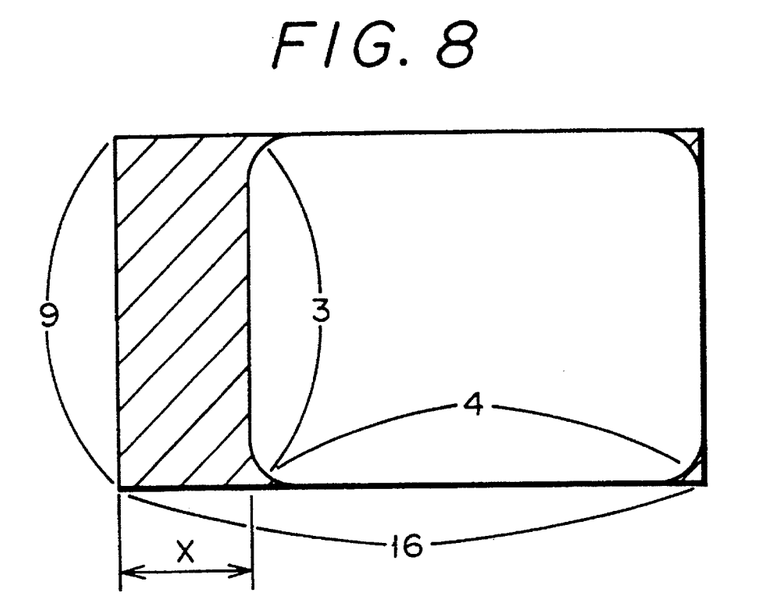
FIG. 8 is an explanatory diagram showing an example of a set state of a display area according to the first embodiment of the present invention.

According to this embodiment, the code represents the length (hereinafter this length will be referred to as "length x") from the left end of a picture based on a video signal having an original aspect ratio to the left end (the left end of a picture displayed in actual practice) of a picture based on a converted video signal. More specifically, as shown in FIG. 8, when the picture based on the converted video signal is located at the rightmost position, then the length X is longest. In this case, the portion to be cut is divided into 256 points and a maximum value 255 in the illustrated example of FIG. 8 is assumed to be a code of 8 bits. Further, when the length x is shortest (i.e., 0: state that only the right end of the picture is cut), then the minimum value 0 is assumed to the code of 8 bits.

Figure 9:
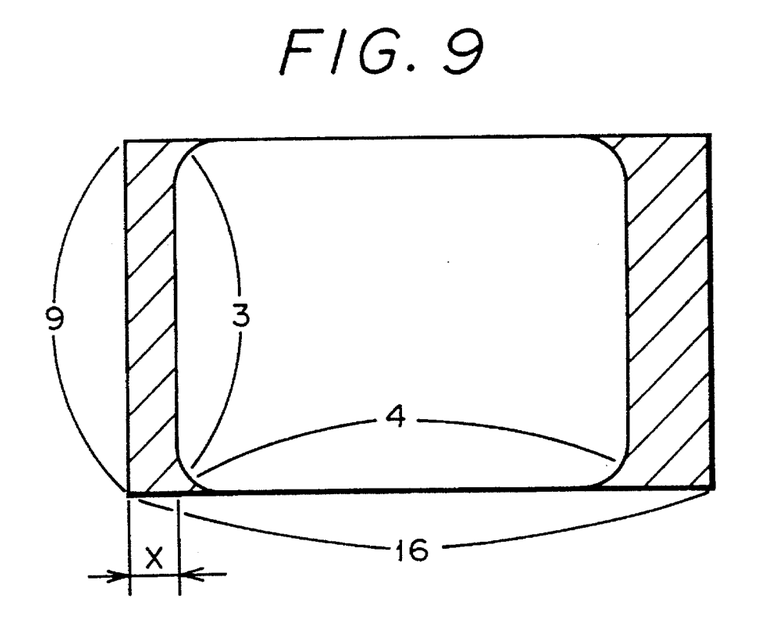
FIG. 9 is an explanatory diagram showing another example of a set state of a display area according to the first embodiment of the present invention.

According to the above-mentioned coding process, when the value of the code of 8 bits is 50, for example, then the code signal instructs that the portion shifted from the left end of the picture based on the video signal having the original aspect ratio by 50 points is determined as the left end of the picture based on the video signal having the converted aspect ratio as shown in FIG. 9.

Figure 10:
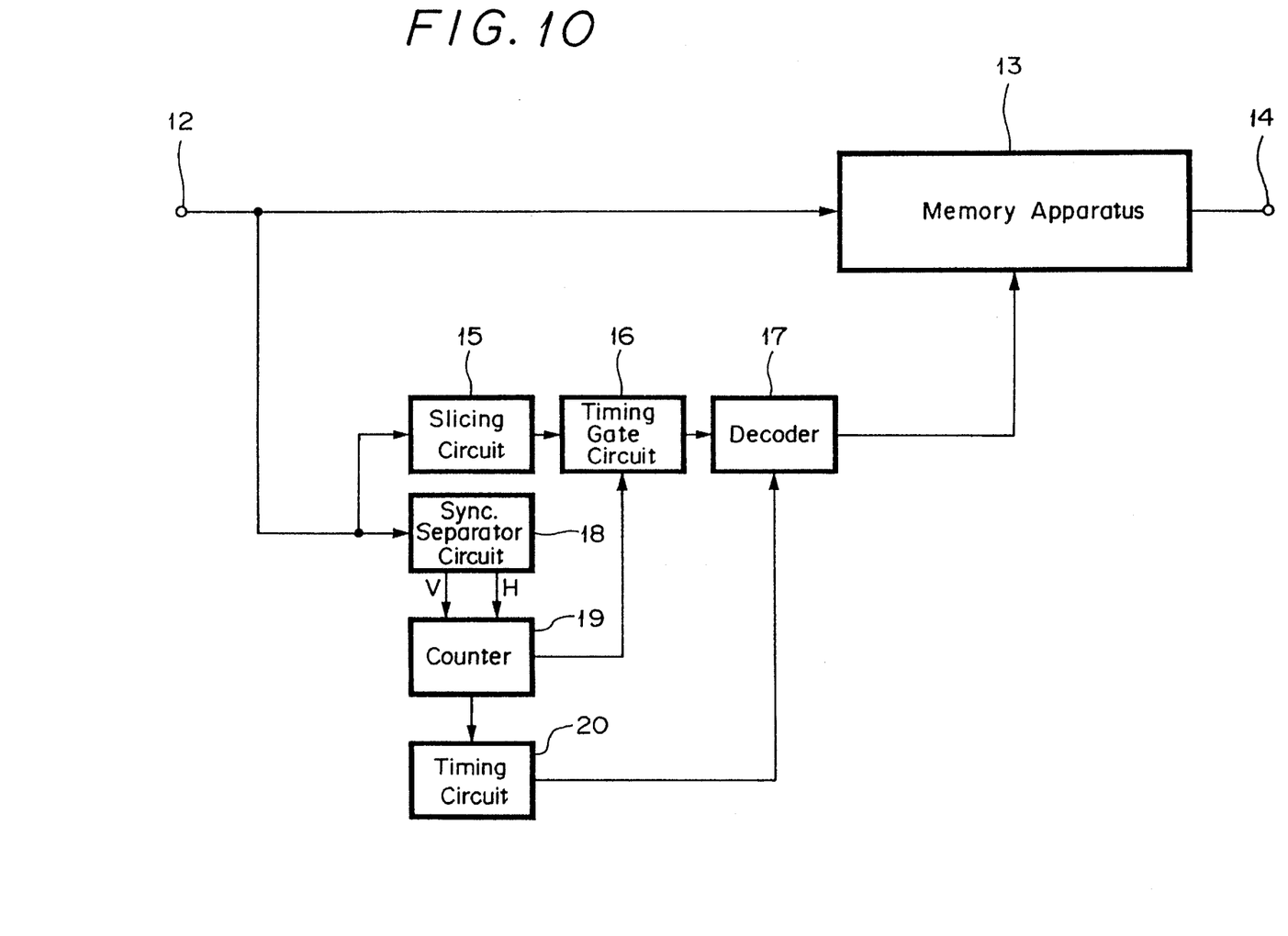
FIG. 10 is a block diagram showing the reproducing system according to the first embodiment of the present invention.

FIG. 10 of the accompanying drawings shows an arrangement of a reception (playback) side which receives the video signal having the above-mentioned code signal supplied from the output terminal 3 (see FIG. 6).

Referring to FIG. 10, the video signal in which the above-mentioned code signal is superimposed upon the vertical blanking period is supplied to a terminal 12, and the video signal applied to the terminal 12 is fed to a memory apparatus 13. The memory apparatus 13 is constructed similarly to the memory apparatus 5 (see FIG. 6), which is provided on the code adding apparatus side as earlier noted, and is operated similarly to the memory apparatus 5. That is, the memory apparatus 13 converts the aspect ratio of the video signal by controlling the write timing and the read-out timing thereof shown in FIG. 7, and the video signal having the converted aspect ratio is supplied to an output terminal 14.

Demodulating means for demodulating the code signal superimposed upon the video signal is provided as an arrangement for supplying a control signal to the memory apparatus 13. The arrangement of this demodulating means will be described below with reference to FIG. 10.

As shown in FIG. 10, the video signal developed at the terminal 12 is supplied to a slicing circuit 15 and an output signal of the slicing circuit 15 is fed to a gating circuit 16 as a signal of high "1" level or low "0" level. Also, a signal gated by the gating circuit 16 in response to an output signal from a counter 19, which will be described later, is supplied to a decoder 17. The decoder 17 operates to decode a code of information representative of the aspect ratio of the video signal and a code of information which sets the display mode.

The video signal applied to the terminal 12 is supplied to a sync. separator circuit 18 which derives horizontal and vertical sync. signals H and V. These horizontal and vertical sync. signals H and V are supplied to the counter 19 and the counter 19 counts the horizontal and vertical sync. signals H and V to thereby detect the horizontal line on which data is superimposed during the vertical blanking period. Then, the gating circuit 16 is controlled at the timing thus detected and only the signal on which the data is superimposed during the vertical blanking period is supplied to the decoder 17.

Further, the count data of the sync. signal from the counter 19 is supplied to a timing circuit 20 and this timing circuit 20 generates a clock sync. signal at the insertion position (superimposing timing) at which the data bit is inserted into each horizontal line. A timing information from the timing circuit 20 is supplied to the decoder 17. The decoder 17 detects each bit of the data byte on the basis of this timing information and decodes the code.

Data (any of 0 to 255) decoded by the decoder 17 is supplied to the memory apparatus 13 which then converts the aspect ratio on the basis of the decoded data supplied thereto. That is, when the decoded data is 0, then the memory apparatus 13 carries out the conversion processing such that only the right-hand side end portion of the picture is cut off; when the decoded data is 255, then the memory apparatus 13 carries out the conversion processing such that only the left-hand side end portion of the picture is cut off; and when the decoded data has an intermediate value, then the cutting position on the left-hand or right-hand side end portion is set in response to the intermediate value of the decoded data.

Then, the video signal having the aspect ratio thus converted is supplied from the output terminal 14 to a monitor receiver (picture screen having an aspect ratio of 4:3), thereby a picture being satisfactorily displayed on the picture screen having the aspect ratio of 4:3. That is, the converted state adjusted by the display positioner 6 (see FIG. 6) on the transmission side of this video signal is reproduced on the basis of the code signal superimposed upon the video signal on the reception side. Accordingly, the converted state is properly adjusted on the transmission side of the video signal in accordance with each picture, whereby such picture is satisfactorily displayed even by the monitor receiver having the picture screen whose aspect ratio is 4:3. It becomes possible to avoid the above-mentioned disadvantage that an image of a person is omitted from the display because of conversion of the aspect ratio as shown in FIG. 3, for example.

Further, in this case, since the code signal is transmitted at every field cycle, the display position can be properly instructed at every frame and hence the optimum display can be effected constantly. When the video signal having the original aspect ratio is reproduced as shown in FIG. 3, then it becomes possible to successively change the display area so that the person on the right-hand side is displayed at a certain time and that the person on the left-hand side is displayed at another time.

If the above-mentioned video signal is received and reproduced by a monitor receiver whose picture screen has an aspect ratio of 16:9, then such monitor receiver can display the whole picture without any aspect ratio conversion.

Figure 11:
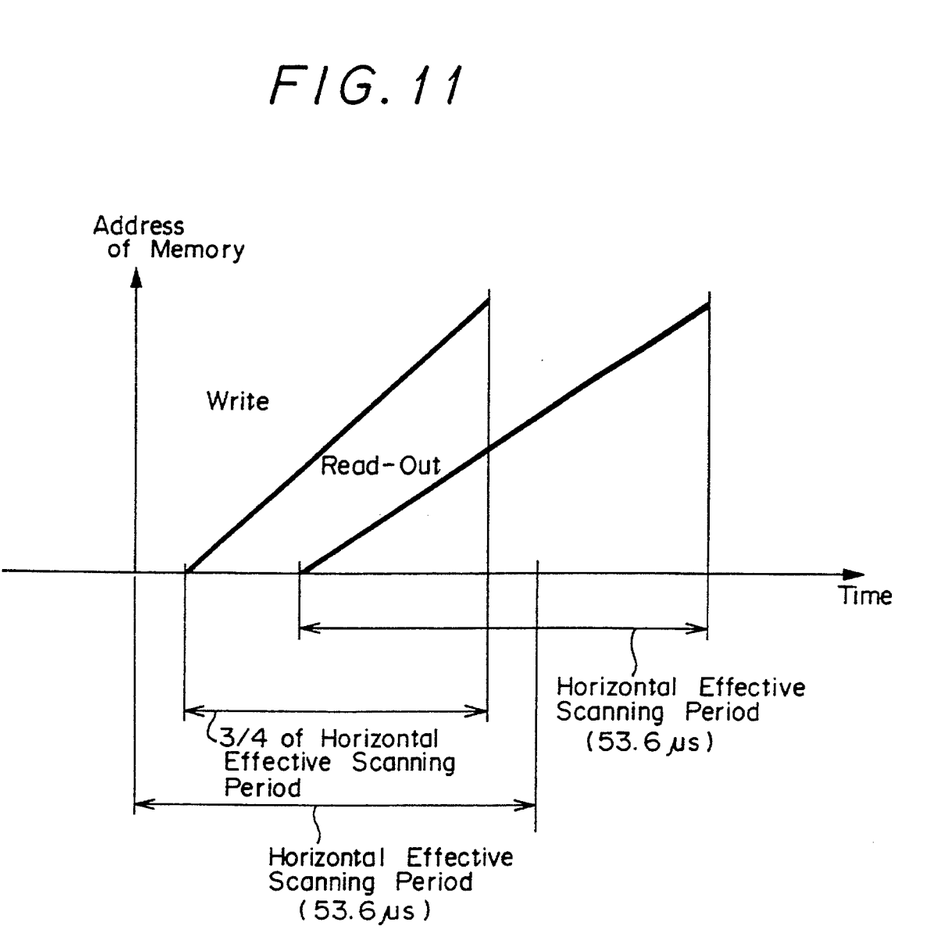
FIG. 11 is a diagram showing a playback processing timing of a memory and, to which references will be made in explaining operation of a second embodiment of the present invention.

While the aspect ratio is converted by the memory apparatus by changing the read-out position of data from the memory as described above, the aspect ratio may be converted by writing data in the memory only during the display period. That is, as shown in FIG. 11, the video signal of about ¾ interval of each horizontal effective scanning period is written in the memory and all written signals are read out from the memory to thereby convert the aspect ratio. In this case, information amount written in the memory is small and hence the storage capacity of the memory can be reduced more.

While the left and right side portions of the picture are cut off to thereby convert the aspect ratio, the present invention is not limited thereto and the upper and lower portions of the picture may be cut off.

Figure 12:
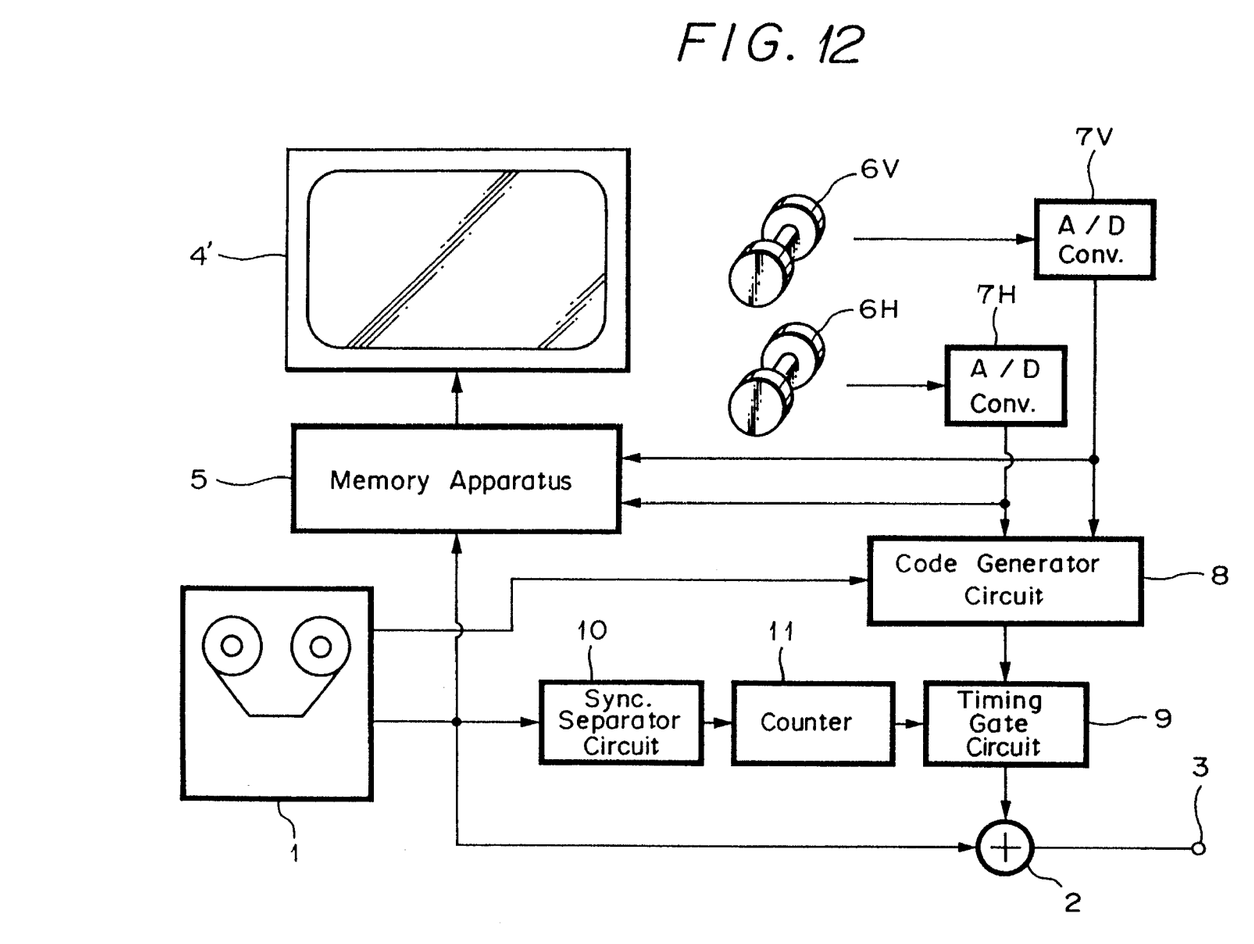
FIG. 12 is a block diagram showing the recording system according to the second embodiment of the present invention.

FIG. 12 of the accompanying drawings shows in block form an arrangement of an apparatus which sets the cutting range in the upper, lower and left, right side portions of the picture according to a second embodiment of the present invention.

In the second embodiment of the present invention, a code used to display a video signal having an aspect ratio of 2:1, for example, on the monitor receiver having the picture screen of the aspect ratio of 16:9 is superimposed upon the video signal.

According to this embodiment, as shown in FIG. 12, as a monitor receiver 4' which is used to determine the adjusting state, there is employed a monitor receiver having a picture screen whose aspect ratio is 16:9. Further, a vertical direction adjusting display positioner 6V and a horizontal and vertical direction adjusting display positioner 6H are respectively prepared as the adjusting display positioner. Adjusted values of the two display positioners 6V and 6H are respectively converted into digital data by A/D converters 7V and 7H, and both digital data thus converted are supplied to the memory apparatus 5 and the code generator circuit 8. The other portions in FIG. 12 are constructed similarly to the circuits shown in FIG. 6 and the signal processings similar to those of the first embodiment of FIG. 6 are effected by the respective circuits.

Figure 13:
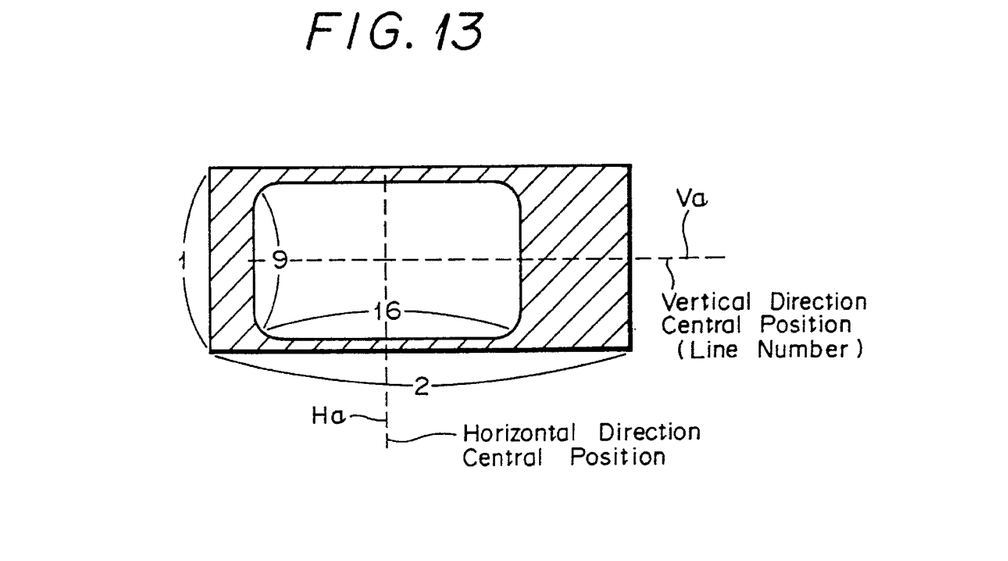
FIG. 13 is an explanatory diagram showing a set state of a display area according to the second embodiment of the present invention.

In this case, central position information of the image thus converted is coded by the code generator circuit 8. That is, as shown in FIG. 13, a horizontal direction central position Ha and a vertical direction central position Va of the image whose aspect ratio is converted into 16:9 are coded by the code generator circuit 8. Furthermore, an information of aspect ratio set at that time also is coded and added to the video signal.

Figure 14A:
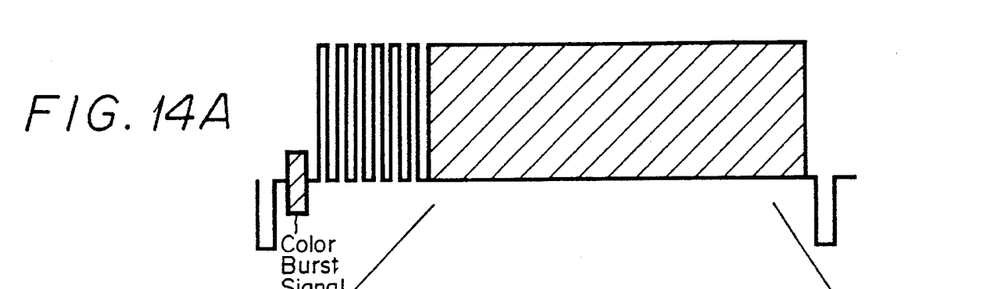
FIGS. 14A and 14B are respectively diagrams showing the state such that the video signal is superimposed upon the vertical blanking period according to the second embodiment of the present invention.
Figure 14B:
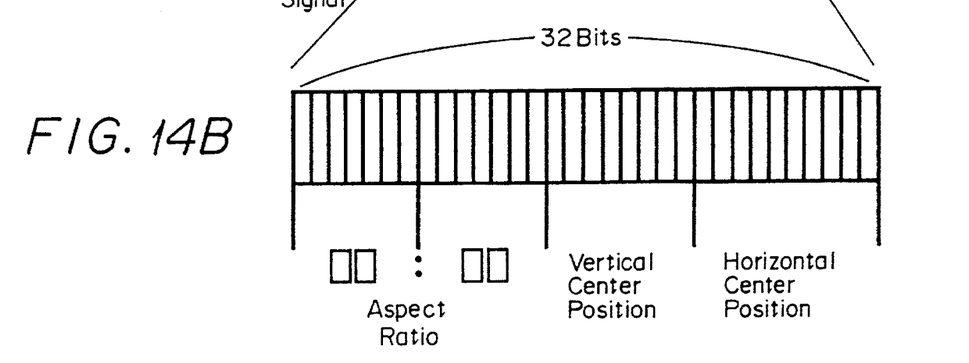

FIGS. 14A and 14B show an example of a format of data added to the horizontal line in that case.

As shown in FIG. 14A, a color burst signal of a predetermined horizontal line within the vertical blanking period on which data is superimposed is followed by clock data of predetermined interval and data of 32 bits synchronized with the clock data. As shown in FIG. 14B, this data of 32 bits is composed of bits of data representative of the aspect ratio and data representative of the central positions in the vertical and horizontal directions. The reason that the clock data is recorded first in the example shown in FIG. 14A, is as follows: An amount of recording information is large as compared with that of the example of FIG. 5 and a transmission rate of data to be recorded is high so that the detection of data in the playback mode cannot be effected only by the position detection in the timing circuit. Therefore, upon playback (demodulation), the data must be demodulated in synchronism with the clock data by utilizing a phase locked loop (PLL) circuit.

In the case of the example shown in FIGS. 14A, 14B, information representative of a magnification must be transmitted in addition to the central position information. That is, the size of the cutting-out range of the picture whose aspect ratio is converted as shown in FIG. 13 may be set by the magnification information. According to this arrangement, the aspect ratio of the displayed picture can be controlled more finely.

While the display position of the picture can be set by using the display positioner 6 in the above embodiments, the present invention is not limited thereto and a display position may be set by a jog dial 21 (see FIG. 6) and a resultant pulse signal may be input to the code generator circuit 8.

According to the present invention, the portion, not displayed due to the different aspect ratio, can be automatically set by identifying the pulse signal within the vertical blanking period. Thus, when a video program, for example, is formed, if the information, which properly instructs the non-display portion, is superimposed upon the video signal beforehand, then it becomes possible to automatically set a proper display mode upon playback of this video program.

Having described preferred embodiments of the invention with reference to the accompanying drawings, it is to be understood that the invention is not limited to those precise embodiments and that various changes and modifications can be effected by one skilled in the art without departing from the spirit or scope of the invention as defined in the appended claims.

What is claimed is:

1. A video signal recording apparatus comprising:

input means for receiving a video signal having a first aspect ratio;

detecting means for detecting a predetermined horizontal scanning line in the vertical blanking period of each frame of said video signal having said first aspect ratio;

positioning means including a jog dial, said positioning means being provided for generating an output signal for setting a portion of said video signal having said first aspect ratio to display on a monitor which displays video signals having a second aspect ratio, said portion of said video signal having said first aspect ratio being moveable to any one of a plurality of contiguous positions along an axis defining said video signal having said first aspect ratio in response to said output signal;

generating means for generating a clock synchronization signal and a position code signal corresponding to the position of said portion;

adder means for adding said clock synchronization signal and said position code signal onto each frame of said predetermined horizontal scanning line to produce a superimposed video signal having said first aspect ratio; and output means for receiving said superimposed video signal having said first aspect ratio.

2. The apparatus according to claim 1 wherein said position code signal has at least a horizontal relative position information corresponding to the position of said portion of said video signal having said first aspect ratio to be displayed.

3. The apparatus according to claim 1 wherein said position code signal has a center position information corresponding to the position of said portion of said video signal having said first aspect ratio to be displayed.

4. The apparatus according to claim 1 wherein said position code signal has a magnifying power information corresponding to a magnification of said portion of said video signal having said first aspect ratio to be displayed.

5. A video signal playback apparatus for playing back a video signal recorded by video signal recording apparatus according to claim 1, said playback apparatus comprising:

input means for receiving a superimposed video signal having a first aspect ratio which contains a clock synchronization signal and a position code signal superimposed on a predetermined horizontal scanning line of each frame of said superimposed video signal;

converting means for converting said superimposed video signal having a first aspect ratio to a video signal having a second aspect ratio;

detector means for detecting said predetermined horizontal scanning line;

synchronization means utilizing said clock synchronization signal for detecting said position code signal;

generator means for generating a timing clock signal in accordance with said position code signal superimposed in said predetermined horizontal scanning line; and decoder means for decoding said position code signal and providing the decoded signal to said converting means.

6. The apparatus according to claim 5 wherein said converting means comprises a memory.

7. A video signal converting apparatus for converting a video signal having a first aspect ratio and recorded by video signal recording apparatus according to claim 1, said converting apparatus comprising:

memory means for memorizing a picture based on said video signal having said first aspect ratio;

position code signal decoding means for decoding a position code signal included in said video signal having said first aspect ratio based on a clock synchronization signal also included in said video signal having said first aspect ratio, said position code signal corresponding to position coordinates of a portion of said picture to be output from said memory means as a video signal having a second aspect ratio; and control means for controlling the address of said memory means and a clock rate of reading said memory means to obtain said video signal having said second aspect ratio in accordance with said position code signal;

wherein said second aspect ratio is smaller than said first aspect ratio.

* * * * *